Sept. 19, 1961   C. S. WEST   3,000,406
CABLE TRANSPOSING MECHANISM
Filed Feb. 13, 1959   6 Sheets-Sheet 1
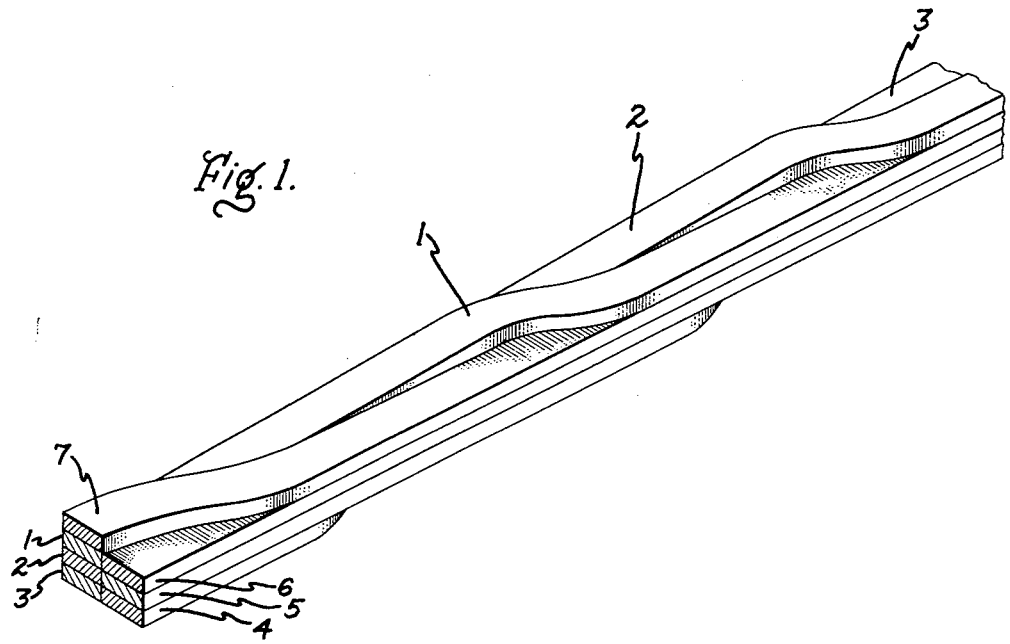
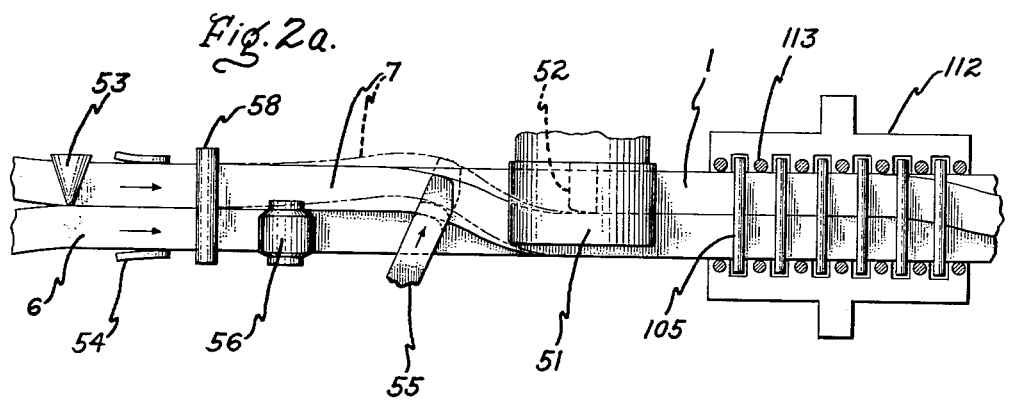
Inventor,
Clifford S. West,
by Gilbert P. Tarleton
His Attorney.

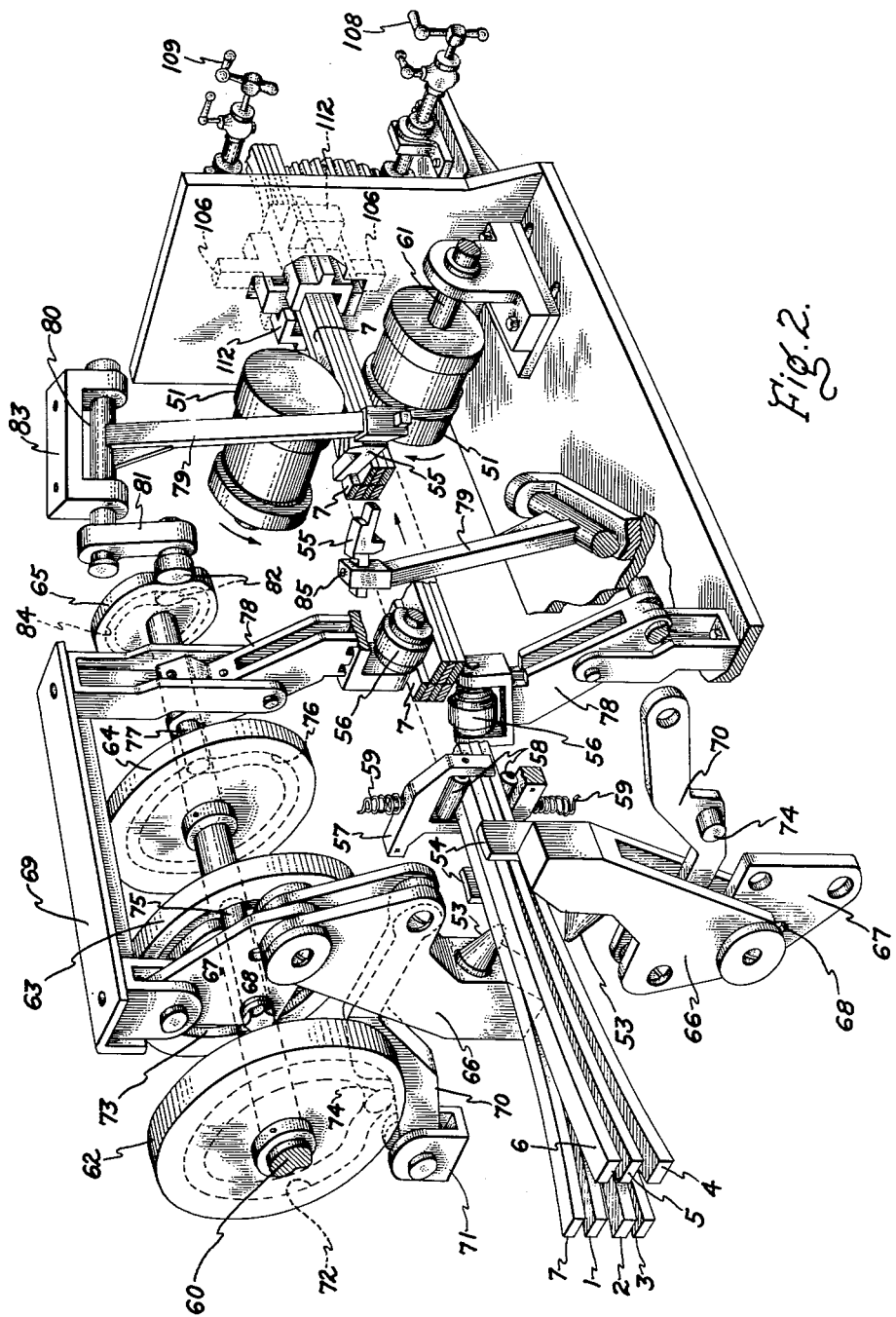

Sept. 19, 1961 C. S. WEST 3,000,406
CABLE TRANSPOSING MECHANISM
Filed Feb. 13, 1959 6 Sheets-Sheet 3
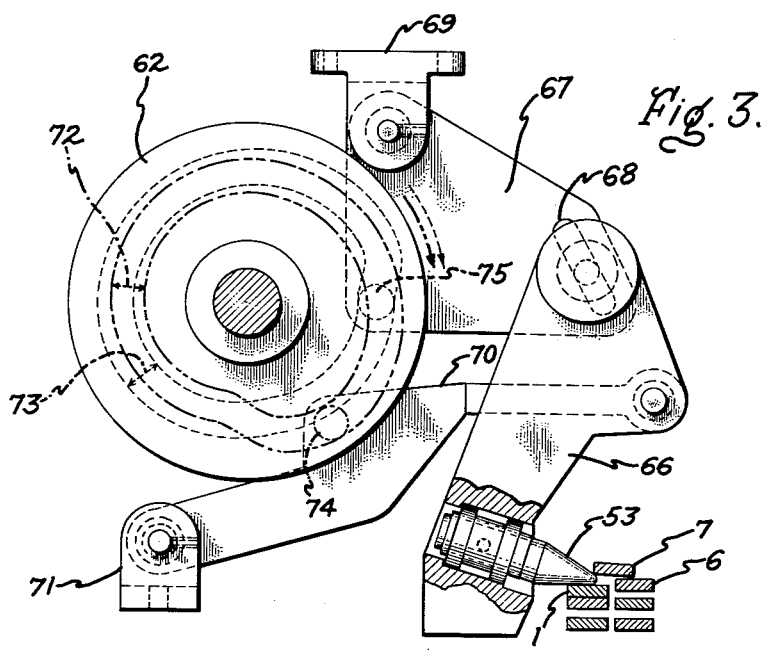
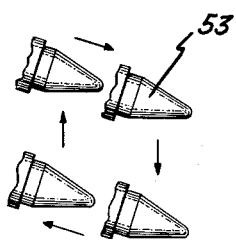
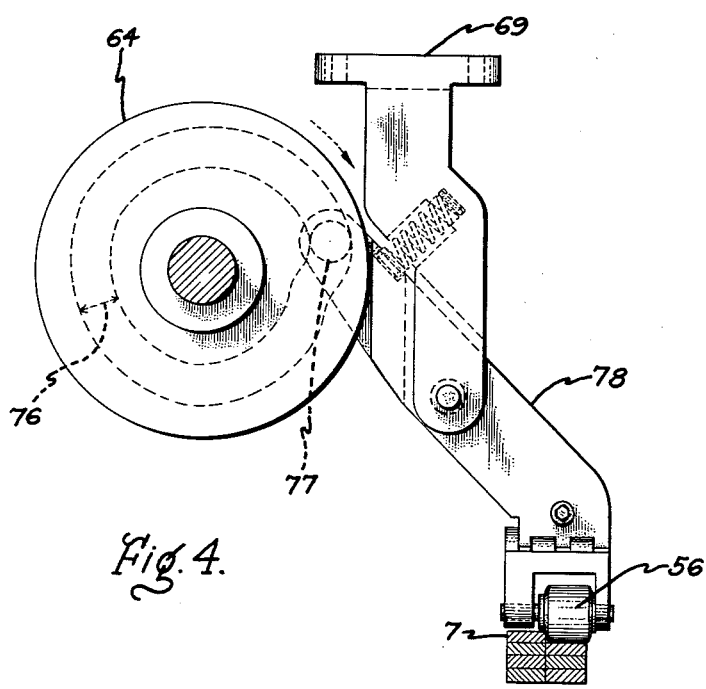
Inventor,
Clifford S. West,
by Gilbert P. Tarleton
His Attorney.

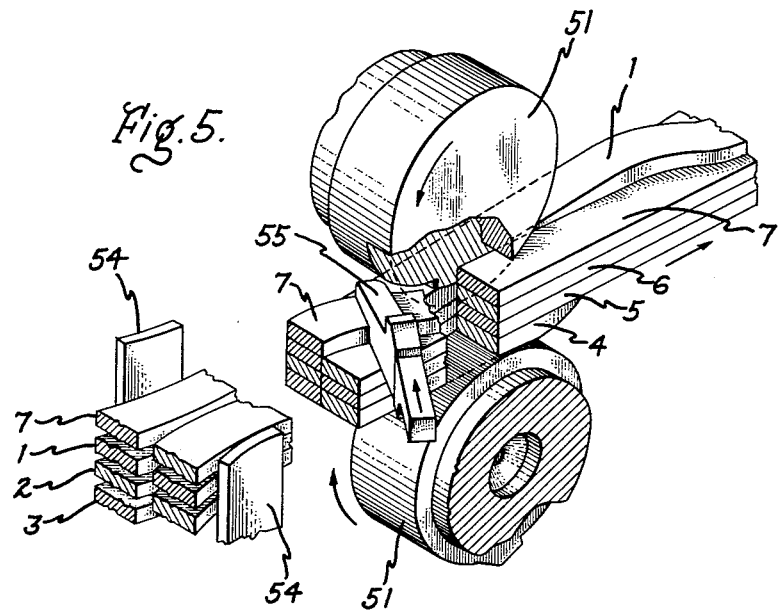
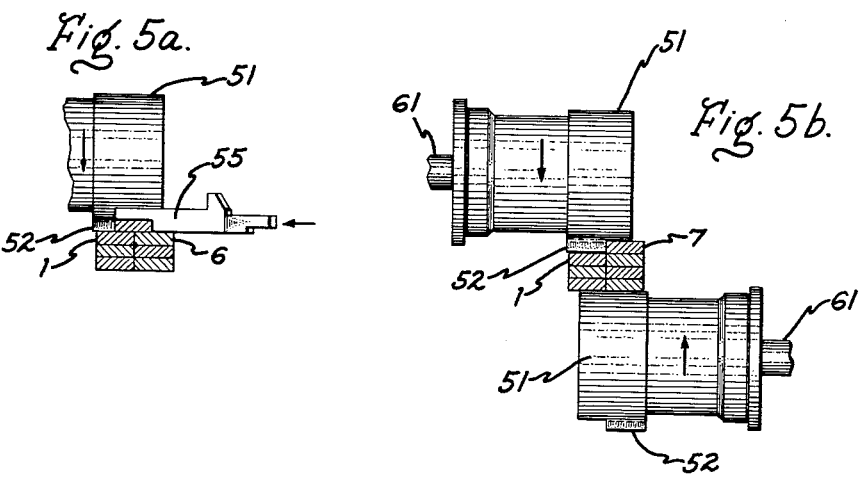

Sept. 19, 1961     C. S. WEST     3,000,406

CABLE TRANSPOSING MECHANISM

Filed Feb. 13, 1959     6 Sheets-Sheet 5

Inventor,
Clifford S. West,
by Gilbert P. Tarlton
His Attorney.

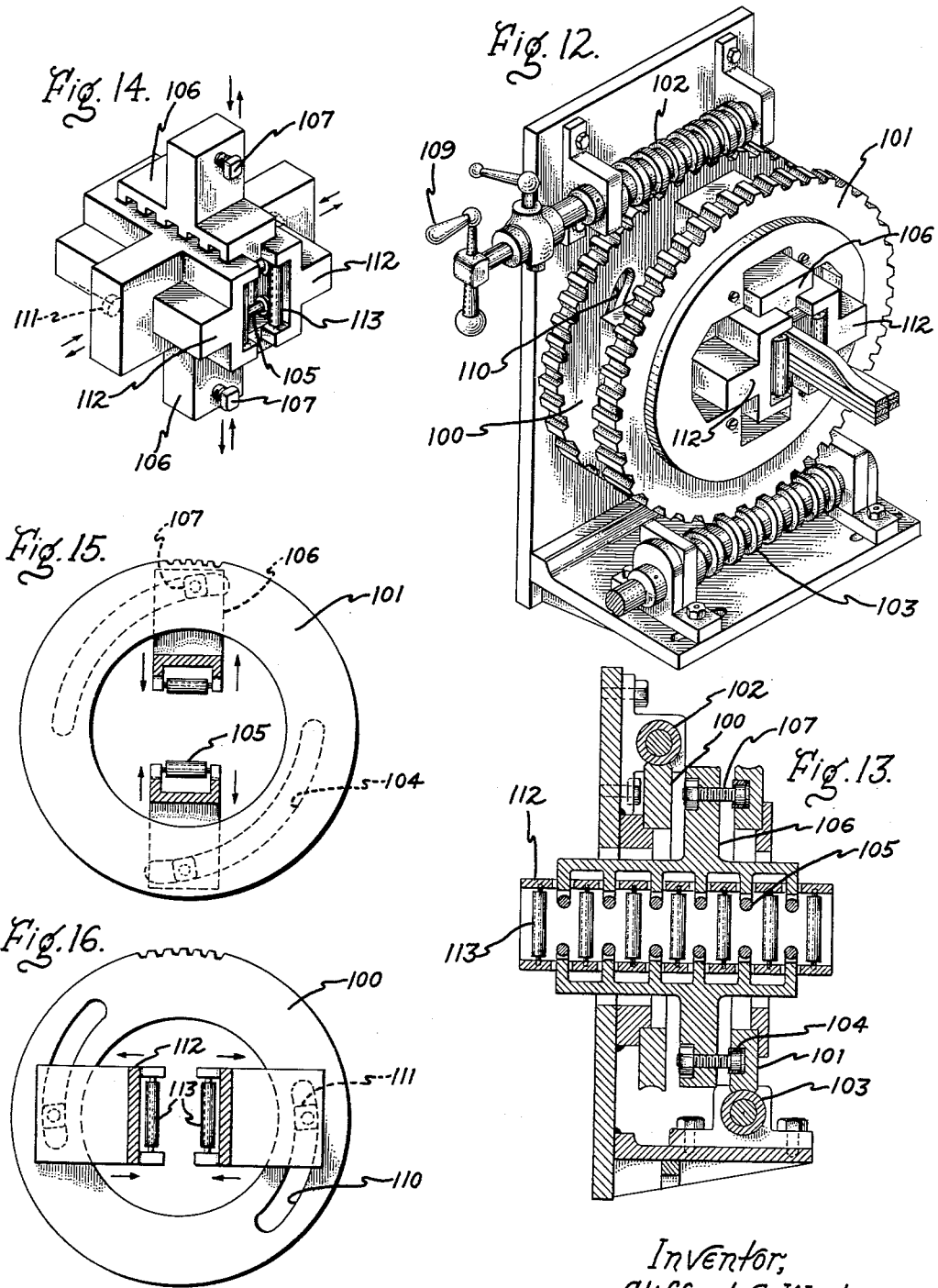

United States Patent Office 3,000,406
Patented Sept. 19, 1961

3,000,406
CABLE TRANSPOSING MECHANISM
Clifford S. West, Adams, Mass., assignor to General
Electric Company, a corporation of New York
Filed Feb. 13, 1959, Ser. No. 793,179
20 Claims. (Cl. 140—71)

This invention relates to an improved machine for making transposed cable. More particularly, this invention is an improvement over the cable transposing apparatus disclosed and claimed in my copending patent application Serial No. 532,412, filed September 6, 1955, now Patent No. 2,986,176, issued May 30, 1961, and assigned to the same assignee as the instant case.

By the term transposed cable is meant a constant width and thickness cable which has rectangular or square cross sectioned strands which are continuously shifted about the cable axis without twisting of the strands or cable and so that each strand successively occupies the same position as is occupied by all the other strands. This type of cable is useful in making electric apparatus coils since it will not be excessively difficult to bend and will have minimum eddy current losses and provide other desirable mechanical and electrical characteristics.

My copending patent application is an improvement over the cable transposing mechanism of Welch, Jr. et al. Patent No. 2,249,509 which is assigned to the same assignee as the instant case. That patent disclosed a cable transposing head which used transposing pushers which acted in a direction perpendicular to the direction of cable travel. This transposing head had the limitation that the pushers tended to scratch or scuff the strands. This restricted the speed of cable travel and the transpositions. Also, the transposing head did not provide any backup pressure for the strands while they were being bent during their transposition.

In my copending patent application these and other disadvantages were overcome by providing an improved transposing head which had rotary cams which made rolling contact with the strands and which were suitably contoured to provide backup pressure for the strands. The principles used in the improved transposing head are still valid. For instance, the device is still useful in transposing the strands of cable which uses ductile material such as copper. However, the device is not entirely satisfactory for transposing the strands of cable which uses resilient material such as aluminum. To take an extreme example, if strands made from spring steel are to be transposed I have discovered that the strands must be overtransposed since they have a tendency to spring back to their original position after their transposition. The same principles apply to aluminum cable although to a lesser degree. In the device of my copending patent application the strands cannot be overtransposed to any significant degree. If there's no or insufficient overtransposition when resilient strands are being transposed the strands of the finished cable will not lie flat but will be twisted.

It is an object of this invention to provide an improved cable transposing mechanism which will overcome the disadvantages of the above discussed prior art mechanisms.

It is a further object of this invention to provide an improved cable transposing mechanism which will not scuff or scratch the cable, which will provide backup pressure for the transposed strands, and which can be used to transpose either ductile or resilient cable such as copper and aluminum cable respectively.

In my invention I have discovered that these objects can be attained by using a combination of rolling cams and pushers. However, unlike the pushers of the Welch patent they do not scuff or scratch the cable. This is because preferably they act diagonally on the cable. This diagonal action can be analyzed as a perpendicular component of motion of the pusher with respect to the strand and a lengthwise component of motion of the pusher with the strand. Since the pusher moves with the strand while it pushes perpendicularly on it there is only one point of contact between the pusher and strand during the transposition as contrasted to the continuous line type of contact in the Welch pusher. In view of these considerations it will be obvious that it is possible to use a perpendicular pusher in the invention if the perpendicular pusher is moved with the strand. In such an arrangement two actual movements of the pusher at right angles to each other will give the same effect as a diagonal pusher. However, the diagonal pusher is preferred for design considerations by reason of its simplicity.

In the invention rotary curved cams are used in combination with the pushers. Rolling contact between the cams and strands introduces no scuffing or scratching of the strands. These cams do the job of raising and lowering the stacks of strands whereas the pushers do the job of laterally transposing the strands. Lugs on the cams also do the job of providing backup pressure for the strands as they are being transposed. The pushers are positioned ahead of the cams. This makes it possible for the pushers to overtranspose the strands and for the pushers and cams to cooperatively carry out their intended functions without interfering with each other.

In the invention the pushers are made adjustable. This feature makes it possible to transpose copper or aluminum cable with the same mechanism by merely making a simple adjustment in the pushers. This adjustable feature also makes it possible to use the machine with a wide range of different size cable. To the same end, in my invention I also provide a novel sizing head which is used to compact the cable to final size after the strands are transposed and which can be readily adjusted to size a wide range of different size cable.

While the specification concludes with claims particularly pointing out and distinctly claiming the subject matter which I regard as my invention, it is believed the invention will be better understood from the following description taken in connection with the accompanying drawings in which:

FIG. 1 is a perspective view of a portion of a transposed cable made with the apparatus of my invention.

FIG. 2 is a broken away and exploded perspective view of a preferred form of my invention.

FIG. 2a is a broken away top view of some of the parts of the apparatus of FIG. 2 to illustrate the operational sequence of these parts.

FIG. 3 is an enlarged side view, in elevation, of the left-hand, down pecker of FIG. 2 and its linkage. It is a down pecker since it pecks the left-hand strands down.

FIG. 3a is a diagrammatic illustration of the various positions assumed by the rotary cone-shaped element of the down pecker.

FIG. 4 is an enlarged side view, in elevation, of the left-hand hold over roller of FIG. 2. It is called a hold over roller since it holds the transposed strand over in its transposed position.

FIG. 5 is an enlarged broken away perspective view of one of the diagonal transposing pushers and the two rotary cams. The right to left transposing pusher and transposing sequence is illustrated.

FIG. 5a is a view from in front of the right to left pusher to further illustrate its position in the FIG. 5 sequence.

FIG. 5b is a view from immediately in front of the two rotary cams to further illustrate their position in the FIG. 5 sequence.

FIGS. 7 to 10 inclusive are a diagrammatic illustration of how the strands of the cable are transposed about the cable axis.

Figure 11:
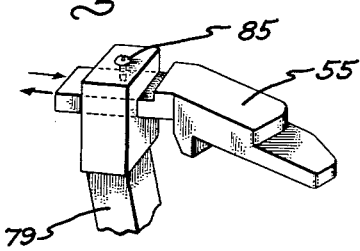

FIG. 11 is an enlarged perspective view of the left to right transposing pusher to illustrate its adjustable feature.

FIG. 12 is a perspective view of the adjustable sizing head of FIG. 2.

FIG. 13 is a side view, in section, of the sizing head.

FIG. 14 is a perspective view of just the jaws of the sizing head to better illustrate their construction.

FIG. 15 is a plan view of the left-hand gear of FIG. 12 which controls the vertical dimension of the sizing head opening.

FIG. 16 is a plan view of the right-hand gear of FIG. 12 which controls the horizontal dimension of the sizing head opening.

In the device illustrated in the drawings certain parts are duplicated. Therefore, like reference numbers will be used for duplicate parts.

The invention is useful in transposing the strands of a cable which has an odd number of strands which are arranged in two vertical stacks with one stack at any point along the cable having one less strand than the other stack. This is illustrated in FIG. 1 and FIGS. 7 to 10. These figures show that the transposing sequence is to continuously transpose the strands around the lengthwise axis of the cable and to do this without twisting the strands. That is, to keep the strands flat. Although rectangular cross sectioned strands are illustrated it will be appreciated that they could just as well be square-shaped in cross section. The invention is also useful in cable having an even or odd number of strands which are arranged in more than two vertical stacks with one of the stacks having one less strand than all the other stacks.

Referring now to FIGS. 2 and 2a, the strands are shown as moving from left to right through the transposing apparatus. The strands can be pulled through the transposing device and sizing head by a winch mechanism or equivalent means as will be obvious to those skilled in the art. They enter from the left in non-transposed condition and exit at the right in transposed condition. The condition of the parts shown in FIGS. 2 and 2a are in the right to left lateral transposing operation. When it is time for the upper strand 7 of the right-hand stack to be moved from right to left the upper rotary cam 51 will have moved so that its lug 52 pushes down on the left-hand stack 1, 2, 3. See also FIGS. 5, 5a, 5b, and 7 to 9.

As the lug 52 does this the upper cone-shaped pecker element 53 will also push down on the top strand 1 of the left-hand stack. See also FIGS. 3 and 3a. The cone-shaped elements 53 are located in front of a pair of stationary side guides 54. The cone-shaped elements 53 and their function are not absolutely necessary. I use them however to make sure that the strand such as 1 of FIG. 3 doesn't get in the way of lateral movement of strand 7. This precaution is advisable since the strands come off a plurality of reels suspended from a rather large diametered rotary steel carrier, these elements not being illustrated since they are well known and understood by those skilled in the art. It will be appreciated that the pecker elements 53 do not necessarily have to be cone-shaped as long as their function is included, although this configuration gives certain advantages to be discussed hereinafter in a more detailed description of the parts of the various subassemblies of the whole apparatus.

Figure 6:
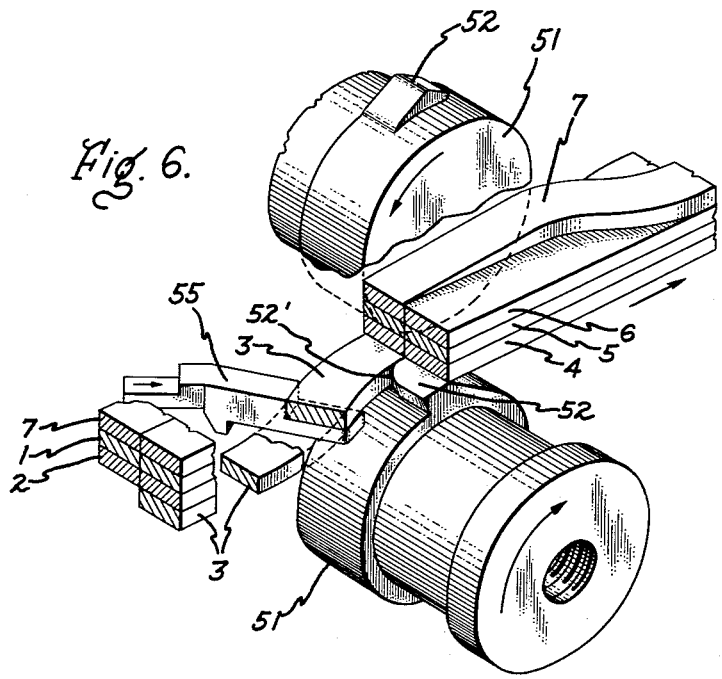
FIG. 6 is an enlarged broken away perspective view of the left to right transposing pusher and the two rotary cams. The left to right transposing sequence is illustrated.

After the left-hand stack of strands 1, 2, 3 are pushed down by the upper lug 52 and cone-shaped element 53 the upper pusher 55 moves from right to left to transpose the upper strand 7 in the right-hand stack over onto the left-hand stack. While the strand is being transposed it is being backed up by the upper lug 52 which is rounded off at 52' (see FIG. 6) so that it will not scratch or scuff the strand. The provision of backup pressure on the strand while it is being transposed means that it is not being bent or twisted over an adjacent strand.

Assuming that resilient strands are being transposed, such as ones made from aluminum, if the strand 7 were moved only far enough to register with the left-hand stack of strands 1, 2, 3, the strand 7 would tend to spring back to its original stack of strands 6, 5, 4. Therefore, it is necessary to overtranspose the strand 7 slightly so that after it does spring back it will come to rest in registration with the stack of strands 1, 2, 3. If this procedure is not followed then the strand 7 will have torsional stresses therein which will relieve themselves by twisting strand 7 out of its intended flat plane.

The extreme position of the pusher 55 to get this overtransposition is illustrated in FIG. 2a by its broken line outline. The pushers 55 act on the strands at a point between the lugs 52 and the stationary side guides 54. This makes for three-point bending. That is to say, the lugs 52 and side guides 54 have the effect of pushing against one side of the strand while the pushers 55 push against the other side. The advantage of three-point bending will be obvious if it is assumed that the function of stationary side guides 54 is omitted. In such case the strand 7 at its left-hand end is not supported so when the upper pusher 55 pushes on the strand, the strand merely fans out to the left of the two stacks of strands. Therefore, the strand at its area of transposition has never really been curved from one stack into the other one as illustrated in FIGS. 1 and 2a. That is to say, instead of the strand curving out of the right-hand stack and into the left-hand stack it would only curve out of the right-hand stack but not back into the left-hand stack.

The angular direction of the pusher and its speed of travel is preferably coordinated with the speed of cable travel and the distance of transposition so that for the whole time the pusher is pushing on the strand it contacts it at only one point. As earlier stated, this diagonal action can be analyzed as a perpendicular component of motion of the pusher with respect to the strand and a lengthwise component of motion of the pusher with the strand. By properly co-ordinating the direction of movement and the speed of the pusher with the speed of the cable travel and the distance of transposition, the lengthwise component of motion of the pusher will be substantially equal to the speed of lengthwise movement of the cable. This co-ordination provides the desired line contact. That is, once the pusher engages the strand there is no movement therebetween. If there is, as in the pushers of the Welch patent, which gives line instead of point contact, the result is cable scuffing and scratching. It will be appreciated that this is undesirable since it may remove some of the film or other kind of insulation on the strands. It will be appreciated that it will not always be possible to obtain true point contact. However, this should be aimed for, and even if it is only a very close approximation the resulting line type of contact will still be shorter and therefore result in less cable scratch or scuff than in the Welch patent. The pusher can be arranged to act at an angle of 45 degrees although improved results will be obtained if the pusher acts up to say within 15 degrees of either side of the 45 degree line.

The pushers 55 are arranged closer to the rotary cams 51 than to the side guides 54 since other elements come into operation between the guides 54 and pushers 55. However, the pushers 55 act sufficiently ahead of the rotary cams 51 so that they can overtranspose and still not interfere with the proper functioning of the rotary cams 51. This is another advantage of three-point bending.

Figure 6A:
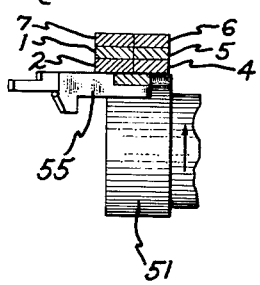
FIG. 6a is a view from in front of the left to right pusher to further illustrate its position in the FIG. 6 sequence.
Figure 6B:
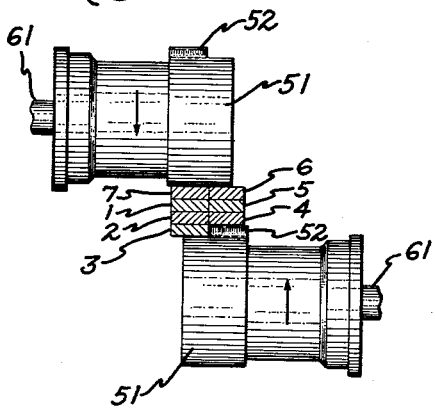
FIG. 6b is a view from immediately in front of the two rotary cams to further illustrate their position in the FIG. 6 sequence.

After the strand 7 is shifted laterally from right to left upper hold over roller 56 comes into operation by moving down and to the left against right hand side of transposed strand 7. This is to make sure that strand 7 doesn't move back to its original stack 6, 5, 4. See also FIG. 4. Rollers 56 aren't essential if the pushers and rotary cams have made a proper transposition. However, I advise use of rollers 56 or their functional equivalent. Otherwise, it is possible for a transposed strand such as 7 in FIG. 9 to interfere with upward movement of stack 6, 5, 4 by the bottom lug 52. See FIGS. 6, 6a and 6b. It will be appreciated that what is advisable under one set of conditions may be essential as a practical matter under another set of conditions. Variable conditions which need to be considered are rate of cable travel, speed of transposition, ductility or resiliency of the strands, the quality of finished transposed cable desired, and the like.

When the hold rollers 56 come into operation the pushers 55 retract. Positioned between the hold rollers 56 and stationary side guides 54 is a resiliently mounted frame 57 having top and bottom rollers 58. The frame can move up and down slightly due to the resilient bias provided by springs 59. The rollers 58 provide additional assurance that the strands of the two stacks will lie flat. Rollers may be substituted for or provided for the side guides 54 similar to rollers 58. However, I have not found this to be necessary inasmuch as stationary side guides 54 do not impose significant wear on the strands and they take less space than would be required by rollers since rollers require means for rotatably mounting the same. It will be appreciated that space saving considerations are important, and particularly where many transpositions are going to be made per unit length of cable. These considerations are taken into account in the preferred form of the invention.

The parts so far described are duplicated on top and bottom and right and left. After the upper hold roller 56 comes into operation and just before it releases the lower rotary cam 51 will have moved so that its lug 52 raises the right-hand stack 6, 5, 4. See also FIGS. 6, 6a and 6b. Simultaneously the lower cone-shaped element 53 will push up on the bottom strand 4 of the right-hand stack. Then the lower pusher 55 will push the bottom strand 3 of the left-hand stack from left to right and then the lower hold roller 56 will operate to hold the transposed strand 3 to the right.

These two sequences of pushing the left-hand stack down and the top right-hand strand to the left and then the right-hand stack up and the left-hand bottom strand to the right are alternated continuously. Of course, it will be appreciated that these directions would be reversed if the strands were being moved clockwise about the lengthwise axis of the cable instead of in the illustrated counterclockwise direction.

The various parts which are duplicated at top and bottom and left and right are synchronized so that they come into play at the proper moment. The various duplicated parts are identical but reversed with respect to each other in position. The lugs 52 on the rotary cams are 180 degrees out of phase with each other. Their movement is synchronized with movement of the other parts by simultaneously driving their shafts 61 with shafts 60 through a not shown gear train or other equivalent means as will be obvious to those skilled in the arts. The shafts 60 (only one of which is shown) control movement of the cone-shaped elements 53, pushers 55 and hold rollers 56. This is accomplished by cams on the shaft 60 which co-operated with cams on the linkage for operating parts 53, 55 and 56. This will now be described.

Referring to FIG. 2, the shaft 60 carries four cam wheels 62, 63, 64 and 65. The cam wheels 62 and 63 control movement of the left-hand down cone-shaped pecker 53. The cam wheel 64 controls movement of the upper hold over roller 56, and the cam wheel 65 controls movement of the right to left upper transposing element 55. The pecker 53 is rotatably mounted in a carrier 66 as illustrated in FIG. 3. The upper end of the carrier 66 has a pivotal and lost motion connection with the right-hand end of a link 67. The lost motion connection is provided by a slot 68 in the link 67. The upper end of link 67 is pivotally connected to a fixed frame 69. The central part of carrier 66 has a link 70 pivotally connected thereto, and the left-hand end of link 70 is pivotally connected to a fixed support 71. The wheel 62 is provided with a groove 72 and the wheel 63 is provided with a groove 73. The groove 72 has a lug 74 riding therein which is connected to the central part of link 70, and a lug 75 which is connected to a central part of the link 67 rides in the groove 73. The grooves 72 and 73 have special configurations which will cause the links 70 and 67 to move which in turn will cause the carrier 66 to move the pecker 53 through the sequence illustrated in FIG. 3a. That is to say, pecker 53 will move on top of strand 1 and peck it down simultaneously as lug 52 pushes the stack of strands 1, 2, 3 down from the FIG. 7 to the FIG. 8 position. Pecker 53 will push strand 1 slightly below strand 6 to make sure that strand 7 does not catch on strand 1 as strand 7 is being transposed from right to left by the upper pusher 55. While the pecker 53 is holding strand 1 down the upper pusher 55 starts to move the strand 7 from right to left and over the nose of the pecker 53. The pecker 53 preferably is cone-shaped and rounded off at its nose so that it does not scratch the strand 1 when it pecks it down or scratch the strand 7 as it rides over the pecker 53. For the same reason it is rotatably mounted in carrier 66. Its cone shape has the advantage that it can hold the strand 1 down while still permitting the strand 7 to be transposed from right to left. The pecker 53 can withdraw before the transposition has been completed or it can dwell in its down position until the transposition has been completed and the upper hold over roller 56 comes into operation.

The roller 56 is pushed down and over to the left against the right hand side of transposed strand 7 by a groove 76 in the wheel 64, and a lug 77 which is connected to the upper end of a pivoted carrier 78 for the roller 56. The carrier 78 is pivotally supported at its central portion from the frame 69.

The diagonal pusher 55 is moved in and out through its transposing sequence by an arm or carrier 79 which is actuated by a crank comprising shaft 80, crank arm 81 and rollers 82 which are connected to the lower end of crank arm 81. The shaft 80 is rotatably mounted in a fixed support 83, which is mounted diagonally to the direction of cable movement, as can be clearly seen from the support 83, shown in FIGURE 2, for the lower pusher 55. One of the rollers 82 rides in a groove 84 formed in the wheel 65 whereas the other roller 82 rides along the outer edge of wheel 65 which has a configuration similar to the groove 84.

Only one shaft 60 has been shown for purposes of simplicity. However, it will be appreciated that there will be another shaft 60 with parts similar to those described above for actuating the lower pecker 53, roller 56 and pusher 55.

The adjustable feature of the pushers 55 will be best understood by viewing the lower left to right pusher 55 of FIG. 2 which is illustrated on an enlarged scale in FIG. 11. The pusher element 55 is always moved through the same stroke diagonally across the cable since this is predetermined or fixed by the design of its actuating parts. These actuating parts, such as elements 65, 82, 81, 80 and 79 do not have to be changed in order to transpose wider strands or vary the degree of overtransposition or have no overtransposition at all. Rather, the only thing that needs to be done to make these variations is to adjust the position of pusher 55 in its carrier 79. That is, adjustment is accomplished by changing the position of element 55 in its direction of diagonal movement. This can be very simply accomplished by merely loosening a screw 85 and sliding pusher 55 back or forward in its carrier 79 and then tightening screw 85 to hold pusher 55 in its new position.

In the invention it is preferred to make the peripheral speed of the rotary cams 51 as close as possible to the speed of lengthwise movement of the cable. This is so as to eliminate wear of the cams 51 on the insulation on the strands. Of course, it will be appreciated by those skilled in the art that it will not always be possible to make these two speeds exactly identical. However, this should be aimed for and if these speeds are substantially equal wear of the cams 51 on the insulation of the strands will be kept to an insignificant minimum since the cams 51 are rounded and make rolling contact with the strands.

After the transposed cable leaves the rotary cams 51 it passes through an adjustable sizing head which will now be described in connection with FIGS. 12 to 16. The sizing head has two annular sizing jaw carrier members such as gear wheels 100 and 101 which are rotated by two worm gears 102 and 103. The two gears 101 and 103 control the vertical dimension of the sizing head opening whereas the other two control the horizontal dimension. The gear 101 has a pair of non-concentric grooves 104 therein. The top and bottom surfaces of the sizing head opening are defined by rollers 105 which are carried by movable sizing jaw members such as frames 106. Studs 107 which are connected to frames 106 have one of their ends riding in the grooves 104 so as to provide a non-concentric groove and follower cam type of adjustable connection between the jaws 106 and carrier 101. Therefore, rotation of the handle 108 which turns gears 103 and 101 moves the frames 106 towards or away from each other to adjust the vertical dimension of the sizing head opening. The width of the opening is controlled by handle 109 which turns gears 102 and 100. The gear 100 also has two non-concentric grooves 110 which have cam action with studs 111 which are connected to side frames 112 which carry side rollers 113. Thus means is provided for readily adjusting the spacing between the roller surfaces of each pair of jaws 106 and 112 independently of the other pair.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

1. In a cable transposing apparatus which has a strand pusher for laterally transposing a strand of a lengthwise moving stranded cable, means for giving said pusher two simultaneous components of movement during its strand transposing operation, one of said components of movement being in a direction which is parallel to the length of the cable and the other being in a direction which is perpendicular to the length of the cable, and the speed of said one component of movement being substantially equal to the speed of lengthwise movement of said cable.

2. In a cable transposing apparatus as in claim 1, wherein said means moves said pusher in a direction which is diagonal to the length of the cable.

3. In a cable transposing apparatus as in claim 2, wherein means is provided for adjusting the position of said pusher in said diagonal direction.

4. In a cable transposing apparatus, the combination of a strand backup element and a strand pusher element which together laterally transpose a strand of a lengthwise moving stranded cable, said elements being adapted to act simultaneously on opposite and lengthwise spaced side portions of a strand while it is being transposed, means for giving said pusher element two simultaneous components of movement during its strand transposing operation, one of said components of movement being in a direction which is parallel to the length of the cable and the other being in a direction which is perpendicular to the length of the cable, and the speed of said one component of movement being substantially equal to the speed of lengthwise movement of said cable.

5. In a cable transposing apparatus, the combination of a strand backup element and a strand pusher element which together laterally transpose a strand of a lengthwise moving stranded cable, said elements being adapted to act simultaneously on opposite and lengthwise spaced side portions of a strand while it is being transposed, and means for moving said pusher element in a direction which is diagonal to the length of a strand to transpose it by bending it about said backup element.

6. In a cable transposing apparatus as in claim 5, wherein said backup element comprises a rounded off lug, said lug being carried by a rotatably mounted member, and means for adjusting the position of said pusher element in said diagonal direction.

7. A cable transposing head which employs three-point bending to laterally transpose a strand of a lengthwise moving stranded cable, said three-point bending being provided by a strand guide element, a strand pusher element, and a strand backup element, said guide and backup elements being adapted to act on lengthwise spaced portions of one side of the strand and the pusher element being adapted to act on an opposite side of the strand between said spaced portions, and means for moving said pusher element against said opposite side.

8. In a cable transposing head as in claim 7, wherein said pusher element has two simultaneous components of movement during its strand transposing operation, one of said components of movements being in a direction which is parallel to the length of the strand and the other being in a direction which is perpendicular to the length of the strand, and the speed of said one component of movement being substantially equal to the speed of lengthwise movement of said cable.

9. In a cable transposing head as in claim 8, wherein said two components of movement are provided by said means which moves said pusher element and in a direction which is diagonal to the length of the strand.

10. In a cable transposing head as in claim 9, wherein means is provided for adjusting the position of said pusher element in said diagonal direction.

11. A cable transposing apparatus which employs three-point bending to transpose a strand of a lengthwise moving stranded cable and has means for momentarily holding the strand in transposed position, said apparatus comprising strand backup, pusher, holdover and guide elements, the three points of said three-point bending being provided by said backup, pusher, and guide elements, said backup and guide elements being adapted to act on lengthwise spaced portions on one side of the strand and the pusher element being adapted to act on an opposite side of the strand between said spaced portions, means for moving said pusher element during its strand transposing operation in a direction which is diagonal to the length of the strand, said holdover element being adapted to act on said opposite side, and means for moving said holdover element against said opposite side after said pusher element has transposed the strand by diagonally pushing on said opposite side against said backup and guide elements.

12. In a cable transposing apparatus as in claim 11, wherein means is provided for adjusting the position of said pusher element in said diagonal direction to vary the magnitude of transposition of the strand.

13. An apparatus for transposing the strands of a lengthwise moving and generally horizontally disposed stranded cable, said apparatus comprising top and bottom cam and pusher elements, said top and bottom cam elements being rounded, rotatably mounted and in engagement with the top and bottom respectively of said cable, each of said cam elements having a lug thereon, the lug on said top and bottom cam elements being adapted for pushing said strands in a down and up direction respectively, said lugs being disposed on said cam elements about 180 rotary degrees out of phase with each other, and said top and bottom lugs being rounded off to serve as backup elements for the strands as they are being laterally transposed by said top and bottom pusher elements respectively, and means for moving said pusher elements in a direction which is diagonal to said cable.

14. An apparatus for transposing the strands of a lengthwise moving and generally horizontally disposed stranded cable, said apparatus comprising top and bottom cam and pusher elements, said top and bottom cam elements being rounded and rotatably mounted for engagement with the top and bottom respectively of said cable at a peripheral speed which is substantially equal to the lengthwise speed of said cable, each of said cam elements having a lug thereon, the lug on said top and bottom cam elements being adapted for pushing said strands in a down and up direction respectively, said lugs being disposed on said cam elements substantially 180 rotary degrees out of phase with each other, and said top and bottom lugs being rounded off to serve as backup elements for the strands as they are being laterally transposed by said top and bottom pusher elements respectively, means for moving said pusher elements in a direction which is diagonal to said cable, the component of movement of said diagonal pusher elements in a direction parallel to said cable being at a speed which is substantially equal to the lengthwise speed of said cable, and said elements acting on lengthwise spaced portions of opposite sides of the strands as they are being laterally transposed.

15. In an apparatus for laterally transposing a strand of a lengthwise moving and generally horizontally disposed stranded cable, said cable comprising two stacks of strands with one stack having one less strand than the other stack; a cam member, a pusher member, and a pecker member, said cam member being rounded, rotatably mounted and in engagement with the top of the top strand of said one stack, a lug on said cam member for pushing said one stack in a down direction said lug being rounded and serving as a backup element for the top strand of the other stack as it is being transposed from said other stack to said one stack, said pecker member having a rotatably mounted and generally cone-shaped element, means for moving said cone-shaped element into engagement with the top of the top strand of said one stack simultaneously with said lug to peck said one stack top strand in a down direction, said lug and cone-shaped element acting on lengthwise spaced portions of said one stack top strand, and means for moving said pusher member against one side of said other stack top strand in a direction which is diagonal to said cable to transpose said other stack top strand by bending it on its other side about said lug and shifting it over said cone-shaped element.

16. An apparatus for transposing the strands of a lengthwise moving and generally horizontally disposed stranded cable, said apparatus comprising top and bottom cam, pusher, and pecker elements, said top and bottom cam elements being rounded, rotatably mounted and in engagement with the top and bottom respectively of said cable, each of said arm elements having a lug thereon, the lug on said top and bottom cam elements being adapted for pushing said strands in a down and up direction respectively, said top and bottom pecker elements being spaced lengthwise along said cable from said top and bottom cam elements and being adapted for pushing said strands in a down and up direction respectively simultaneously with said lugs, and said top and bottom lugs being rounded off to serve as backup elements for the strands as they are being laterally transposed by said top and bottom pusher elements respectively, said pusher elements acting on said strands between said pecker and cam elements, and means for moving said pusher elements against said strands in a direction which is diagonal to said cable.

17. A sizing head comprising a pair of side jaw members and a pair of top and bottom jaw members, said side jaw members and said top and bottom jaw members being positioned opposite to each other and having spaced roller surfaces facing each other which define an opening through said four jaw members, means for adjusting the size of said opening, said means comprising a generally annular shaped rotary carrier member for each pair of jaw members, said carrier members being axially aligned with each other, said four jaw members extending through said carrier members, a connection between each carrier member and its pair of jaw members whereby when each carrier member is rotated its pair of jaw members are moved relative to each other, and means for rotating said carrier members independently of each other.

18. A sizing head comprising a pair of side jaw members and a pair of top and bottom jaw members, said side jaw members and said top and bottom jaw members being positioned opposite to each other and having spaced roller surfaces facing each other which define an opening through said four jaw members, means for adjusting the size of said opening, said means comprising a generally annular shaped rotary carrier member for each pair of jaw members, said carrier members being axially aligned with each other, said four jaw members extending through said carrier members, each carrier member having two non-concentric and diagonally positioned grooves formed therein for supporting and moving its pair of jaw members with respect to each other, a connection between each pair of jaw members and the grooves of its carrier member, and means for rotating said carrier members independently of each other.

19. A device for transposing lengthwise moving strands into transposed cable and sizing said cable, said device having a strand entrance side and a cable exit side, said exit side having adjustable cable sizing means, and adjustable strand transposing means ahead of said adjustable sizing means, said strand transposing means comprising two strand pusher elements for laterally transposing the strands, said pusher elements being adapted to move against the strands in a direction which is diagonal to the length of the strands, means for actuating said pusher elements one at a time, and means for adjusting the position of said pusher elements along their diagonal direction of movement, and said adjustable sizing means comprising two pairs of oppositely positioned jaw members which have spaced roller surfaces, said four jaw members together defining an adjustable opening therebetween, a rotary carrier for each one of said pairs of jaw members, said carriers being hollow and axially aligned and said four jaws extending therethrough, and a connection between each carrier and its pair of jaw members whereby when each carrier is rotated its pair of jaw members are moved with respect to each other, and means for rotating the carriers independently of each other.

20. An adjustable device for transposing lengthwise moving strands into transposed cable and sizing said cable, said device having a strand entrance side and a cable exit side, said entrance side having strand guide means and said exit side having adjustable cable sizing means, and adjustable strand transposing means between said guide means and sizing means, said transposing means comprising a pair of strand pusher elements and a pair of rotary cams, said rotary cams having rounded lugs which provide backup pressure for the strands as they are being laterally transposed by the pusher elements, said pusher elements being arranged to move against the strands in a direction which is diagonal to their length, means for bringing said lugs and pusher elements into operation in the sequence of first a lug, then a pusher, then the other lug and then the other pusher, and means for adjusting the position of said pusher elements along their diagonal direction of movement to adjust the magnitude of strand transposition, and said adjustable sizing means comprising two pairs of oppositely positioned and movable jaw members which have spaced roller surfaces facing each other, said four jaw members together defining an adjustable opening therebetween, a generally annular-shaped rotary carrier for each pair of jaw members, said carriers being axially aligned and said four jaw members being supported thereby and extending therethrough, and a non-concentric groove and groove cam follower type of connection between each carrier and each of its jaw members for adjusting the spacing between its jaw members, by rotation of the carrier, and means for rotating the carriers independently of each other.

References Cited in the file of this patent

UNITED STATES PATENTS

| | | |
|---|---|---|
| 2,234,996 | Welch et al. | Mar. 8, 1941 |
| 2,249,509 | Welch et al. | July 15, 1941 |

FOREIGN PATENTS

| | | |
|---|---|---|
| 708,868 | Great Britain | May 12, 1954 |

UNITED STATES PATENT OFFICE

CERTIFICATE OF CORRECTION

Patent No. 3,000,406              September 19, 1961

Clifford S. West

It is hereby certified that error appears in the above numbered patent requiring correction and that the said Letters Patent should read as corrected below.

Column 9, line 70, for "arm" read -- cam --.

Signed and sealed this 3rd day of April 1962.

(SEAL)
Attest:

ERNEST W. SWIDER                      DAVID L. LADD
Attesting Officer                      Commissioner of Patents